Figure 1:
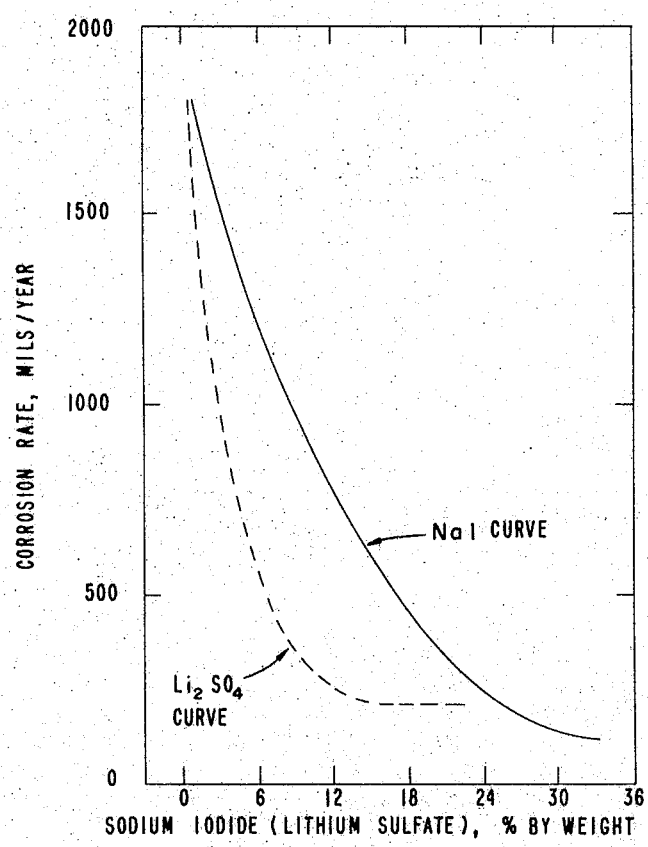
Figure 2:
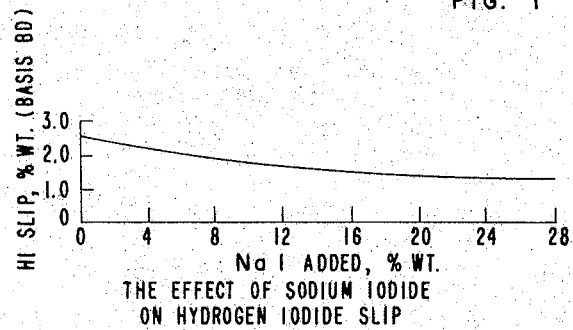
Figure 3:
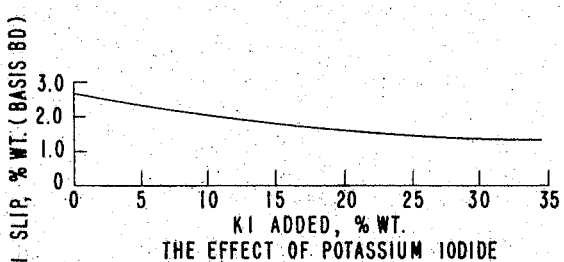

THE EFFECT OF SODIUM IODIDE
ON HYDROGEN IODIDE SLIP

THE EFFECT OF POTASSIUM IODIDE
ON HYDROGEN IODIDE SLIP

INVENTORS:
HERBERT L. BENSON, JR.
GEORGE S. MILL
BY: John H. Colvin
THEIR ATTORNEY

3,336,413
CORROSION INHIBITION IN IODATIVE DEHYDROGENATION USING MOLTEN SALT SYSTEMS

Herbert L. Benson, Jr., Houston, Tex., and George S. Mill, Westport, Conn., assignors to Shell Oil Company, New York, N.Y., a corporation of Delaware
Filed Apr. 27, 1966, Ser. No. 545,707
4 Claims. (Cl. 260—680)

This invention relates to the iodative dehydrogenation of organic compounds.

Maxwell Nager, in U.S. Patent 3,080,435, issued Mar. 5, 1963, discloses a method for dehydrogenating organic compounds which involves the following steps: (1) iodative dehydrogenation of an organic compound by reacting the organic compound with elemental iodine in contact with a molten metal iodide and metal oxide or hydroxide; (2) immediately reacting the resulting hydrogen iodide with the metal oxide or hydroxide; and (3) regenerating elemental iodine from metal iodide by reaction with oxygen. However, corrosion and pitting due to localized attack occurs on the surface of the reactor metal which comes in contact with the molten salt and reaction vapors.

Many of the common alloys which are available for use in other dehydrogenation systems cannot be used in iodative dehydrogenation reactors, the temperature of the molten salt usually being greater than about 975° F. In these reactors, due to the presence of a very corrosive vapor phase containing, inter alia, iodine, hydrogen iodide, oxygen and steam, corrosion in excess of 1500 mils per year may occur.

In addition to corrosion, hard, black tenacious deposits occur in the oxidation zone, which, in some cases, might lead to reactor plugging. With lithium iodide, this material has been identified as predominantly lithium ferrite, $LiFeO_2$, the formation of which is initiated by the attack of oxygen and iodine or hydrogen iodide on steel, leading to the formation of iron oxides and subsequently to lithium ferrite.

It is, therefore, a principal object of the present invention to provide an iodative dehydrogenation system wherein corrosion of the reactor is minimized. A further object is to provide a molten salt system for an iodative dehydrogenation reactor which minimizes the formation of lithium ferrite. Another object is to provide a method for the reduction of the hydrogen iodide content of the vapor phase of an iodative dehydrogenation system.

Other objects and advantages of the invention will be apparent and better understood from the following detailed description thereof, which will be made in part with reference to the accompanying drawing, wherein:

FIG. I is a graphic representation of the effects of lithium sulfate and sodium iodide in the molten salt system of an iodative dehydrogenation reactor on the corrosion rates of the reactor;

FIG. II is a graphic representation showing the effect of sodium iodide in the molten salt system of an iodative dehydrogenation reactor on hydrogen iodide loss; and FIG. III is a graphic representation of the effect of potassium iodide in the molten salt system of an iodative dehydrogenation reactor on hydrogen iodide loss.

It has now been found that corrosion can be reduced and other advantages obtained in an iodative dehydrogenation utilizing a lithium iodide melt by providing certain other inorganic salts in the melt. In particular, it has been found that corrosion of the reactor can be reduced by providing lithium sulfate, sodium iodide, or potassium iodide, or mixtures thereof, in the molten LiI/LiOH/iodine system used in an iodative dehydrogenation reactor. Such a reduction in corrosion rates permits reactor operation for longer periods of time before parts replacement becomes necessary. Besides this advantage there are several others, one being the improvement of product yield and purity.

One of the major causes of corrosion of the reactor walls, as mentioned earlier, is extremely corrosive vapors, such as hydrogen iodide, which come in contact with the reactor walls. This occurs partly because of the incomplete reaction of the hydrogen iodide with the metal oxide or hydroxide to form the metal iodide, giving rise to hydrogen iodide slip from the reaction zone into the subsequent portions of the reactor. By using potassium or sodium iodide or lithium sulfate, or mixtures thereof, in the molten $LiI/LiOH/I_2$ system, this hydrogen iodide slip can be reduced substantially, not only lowering the corrosion rates, but also increasing the efficiency of the whole system by providing a more effective means for hydrogen iodide capture and conversion to metal iodide. The reduction in hydrogen iodide slip in turn reduces the loss of iodine from the system, thus making the whole operation more economical.

Further, there is a tendency for carbonaceous material to build up in the reactor and become entrained in the molten salt. This coke material tends to form a slag layer on the salt surface, and may become sufficiently high to cause foaming in the reactor sump and in the product outlet line, and to increase the salt viscosity to the point where the unit becomes inoperable. However, the addition of lithium sulfate or sodium or potassium iodide, or mixtures thereof, permits the settling-out of the carbonaceous slag by altering the physical properties of the salt melt, i.e., by lowering the melt density, surface tension, viscosity and freezing point.

Among the more common alloys which are commercially available for use in the construction of iodative dehydrogenation reactors, chrome-nickel stainless steels have exhibited the highest resistance to the iodative dehydrogenation system. Therefore, for the purposes of describing this invention, these stainless steels will be considered as model metals for iodative dehydrogenation reactors. Further, for the sake of brevity and specificity, this specification will describe the corrosion inhibition in iodative dehydrogenation reactors with respect to the conversion of butane/butene to butadiene at temperatures in excess of 975° F., although the invention is equally applicable to all conversions envisaged by and disclosed in U.S. Patent 3,080,435.

Referring now to the drawing, FIG. I shows graphically the decrease in corrosion rates of an iodative dehydrogenation reactor with the addition of increasing quantities of lithium sulfate or sodium iodide to the molten $LiI/LiOH/I_2$ system. As shown, the presence of the inorganic salt exerts a marked influence on the corrosion rate of the stainless steel reactor. When sodium iodide is used as the inorganic salt, at levels of 25% by weight and greater, corrosion rates as low as 130 to 140 mils per year are obtained, as compared with rates of greater than 1800 mils per year found in its absence. With lithium sulfate, at levels of 10% by weight and greater, the corrosion rates are much less than those found in its absence. It is apparent from FIG. I that while the ultimate corrosion rate at high concentrations of the inorganic salt is about 100 mils per year lower in the sodium iodide case than in the lithium sulfate case, in either case the ultimate corrosion rate with either additive is greater than ten times less than that found in its absence.

Table I, which follows, illustrates the effect of lithium sulfate as a corrosion inhibitor in a molten $LiI/LiOH/I_2$ system.

um hydroxide was present. However, with a 10.9 percent by weight lithium sulfate concentration, there was a remarkable change in the appearance of the test specimens. The sample of Run 7 showed that the measured corrosion rate is caused only by general metal loss, since there was essentially no pitting of the surface of the metal. In Run 8, with 10.2 percent by weight lithium sulfate present, a hard, black, tenacious scale formed on the specimen, but with a complete absence of pitting.

TABLE I

| Run No. | 1 | 2 | 3 | 4 | 5 | 6 | 7 | 8 | 9 | 10 | 11 | 12 |
|---|---|---|---|---|---|---|---|---|---|---|---|---|
| LiOH, percent wt.: | | | | | | | | | | | | |
| Initial | 0 | 3.0 | 3.0 | 5.0 | 0 | 3.1 | 3.0 | 3.1 | 4.9 | 5.0 | 2.9 | 2.3 |
| Final | 0.05 | 1.6 | 1.3 | 2.9 | 0 | 2.3 | 2.6 | 2.2 | 3.8 | 1.4 | 1.6 | 2.0 |
| $Li_2SO_4$, percent wt.: | | | | | | | | | | | | |
| Initial | 0 | 0 | 0 | 0 | 10.0 | 5.1 | 10.9 | 10.2 | 10.0 | 10.1 | 15.0 | 18.4 |
| Final | 0 | 0 | 0 | 0 | 9.7 | 4.7 | 10.6 | 9.9 | 8.6 | 7.8 | 14.3 | 17.9 |
| Average Temperature, °F | 1,050 | 1,050 | 1,045 | 1,050 | 1,055 | 1,053 | 1,050 | 1,050 | 1,050 | 1,075 | 1,055 | 1,045 |
| $I_2$ Pressure, p.s.i.a | 7.9 | 8.3 | 9.9 | 7.4 | 7.7 | 8.8 | 9.0 | 8.7 | 8.8 | ⁴(9.7) | 8.6 | 8.4 |
| Time, hr | 18 | 19 | 18 | 18 | 24 | 18 | 18 | 24 | 18 | 64 | 18 | 10 |
| Corrosion, Rate, mils/yr.:¹ | | | | | | | | | | | | |
| Immersed | ²>12,600 | 2,410 | 1,830 | 1,360 | 1,490 | 620 | 230 | 320; 330 | 260 | ³155 | ³185 | ³200 |
| Vapor | 1,040 | 780 | 1,100 | 480 | 590 | 750 | 740 | 460 | 600 | | 345 | 460 |

¹ Corrosion rates based on weight loss of specimens.
² Specimen completely disintegrated at end of run.
³ Hard, tenacious scale not removed prior to weighing.
⁴ Estimated value as iodine flow ceased before end of run.

The data of Table I show that the presence of lithium sulfate in the molten $LiI/LiOH/I_2$ system causes a great decrease in the corrosion rates of the stainless steel reactor. At levels of 10 percent by weight and more of the lithium sulfate, the corrosion rates are approximately ten times less than those found in the molten $LiI/LiOH/I_2$ system without lithium sulfate. At levels of 3 percent by weight lithium hydroxide, and with no lithium sulfate present, corrosion rates were found to be in the range of 1800 to 2400 mils per year (Runs 2 and 3 of Table I); and by increasing the concentration of lithium hydroxide to 5 percent by weight present in the molten salt, with still no lithium sulfate present, corrosion rates were substantially less than those found at the lower lithium hydroxide concentrations (compare Run 4 with Runs 2 and 3), and even less than those found with no lithium hydroxide present but with 10 percent by weight lithium sulfate present (Run 5). However, a synergistic effect is noted when Runs 7 and 5, or Runs 10 and 4, are compared. With 3 percent by weight lithium hydroxide and 10.9 percent by weight lithium sulfate, the corrosion rate dropped to 230 mils per year, as compared with rates of about 1490 mils per year with no lithium hydroxide, and 10 percent by weight lithium sulfate. Run 10 demonstrates this synergistic effect even more clearly; with 5 percent by weight lithium hydroxide, and 10.1 percent by weight lithium sulfate, corrosion rates were found to be about 155 mils per year, as compared to the rate of 1360 mils per year found in Run 4 where 5 percent by weight lithium hydroxide, but no lithium sulfate, was present. However, since lithium hydroxide is an integral part of the molten salt system used in iodative dehydrogenation reactors, the improvement achieved by the use of lithium sulfate in the molten salt system is readily apparent from these data.

These data were obtained by immersing test samples of stainless steel in the molten $LiI/LiOH/I_2$ medium. In addition to the immersed specimens, however, identical steel specimens were positioned above the molten salt to measure the vapor phase corrosion rates. Although the data for the vapor phase measurements in Table I are much more scattered than those for the liquid phase measurements, a definite decrease in corrosion rates with increasing lithium sulfate concentration is found.

Of the specimens immersed in the molten $LiI/LiOH/I_2$ medium, several deserve particular attention. The samples used in Runs 2 and 3 of Table I (no lithium sulfate present) showed that the high corrosion rates are due not only to general metal loss, but also to severe localized attack resulting in extensive pitting of the metal surface. The same was found in the case of Run 5, where no lithi- From Table II, it is apparent that the presence of sodium iodide likewise markedly affects the corrosion rates of the immersed specimens. At levels of 25 percent by weight sodium iodide and above, corrosion rates of as low as 130 to 140 mils per year were obtained for the molten $LiI/LiOH/I_2$ system, as compared with rates of greater than 1800 mils per year in its absence.

TABLE II

| Run No. | 13 | 14 | 15 | 16 | 17 |
|---|---|---|---|---|---|
| LiOH, percent wt.: | | | | | |
| Initial | 3.0 | 2.9 | 3.0 | 3.1 | 3.1 |
| Final | 1.3 | 1.7 | 1.7 | 2.3 | 1.8 |
| NaI, percent wt.: | | | | | |
| Initial | 0 | 13.0 | 19.1 | 25.0 | 31.1 |
| Final | 0 | 15.7 | 20.2 | 30.6 | 33.2 |
| Salt temperature, °F | 1,045 | 1,050 | 1,045 | 1,045 | 1,050 |
| $I_2$ Pressure, p.s.i.a | 9.9 | 9.0 | 9.1 | 8.9 | 9.2 |
| Time, hr | 18 | 18 | 18 | 18 | 18 |
| Corrosion Rate, mils/yr.:¹ | | | | | |
| Immersed | 1,830 | 620 | 580 | 130 | 140 |
| Vapor | 1,100 | 540 | 370 | 320 | 430 |

¹ Corrosion rates based on weight loss of specimens.

The appearance of the test specimens after exposure to the $LiI/LiOH/I_2$ system containing sodium iodide is also significant. With lithium sulfate, the samples were often found to be covered with a hard, black tenacious scale. However, in the presence of sodium iodide, a loose, flaky substance was present on the samples, which could easily be removed with an abrasive eraser. Although some pitting was found in the sodium iodide case, the intensity of the pitting was greatly reduced from that found in the molten salt system without sodium iodide. Instead, an over-all "orange-peel" appearance was present.

Test runs using potassium iodide as the inorganic salt showed a reduction in corrosion rates of the stainless steel specimens similar to those found with sodium iodide. In one run, with 14 percent by weight potassium and 3 percent by weight lithium hydroxide present, after 18 hours of exposure the samples showed a corrosion rate of 156 mils per year for the immersed specimen and 600 mils per year for the vapor phase sample.

The appearance of the samples after exposure to a potassium iodide modified molten $LiI/LiOH/I_2$ system resembled that found with sodium iodide modified system, i.e., a loose, flaky substance was present on the samples, which could easily be removed with an abrasive eraser revealing an over-all "orange-peel" effect on the underlying metal surface.

Various combinations of sodium and potassium iodide and lithium sulfate were found to exhibit a synergistic effect. The addition of lithium sulfate to melts containing potassium or sodium iodide resulted in completely scale-free specimens, none of which showed any sign of pitting. The data demonstrating this synergistic effect are summarized in Table III.

dition, Table IV illustrates that lithium sulfate is beneficial in reducing hydrogen iodide slip. With about 10.5 percent by weight lithium sulfate present, the hydrogen iodide slip is reduced from 3.86 percent by weight (basis butadiene yield) to about 2.24 percent by weight.

TABLE IV

[Feed: n-Butane. Dehydrogenation zone temperature: 1,035° F.]

| Run No. | 22 | 23 | 24 | 25 | 26 | 27 |
|---|---|---|---|---|---|---|
| Average Salt Composition, percent wt.: | | | | | | |
| LiI | 97.2 | 94.2 | 90.0 | 85.0 | 81.4 | 78.7 |
| LiOH | 2.02 | 2.01 | 1.95 | 2.18 | 2.16 | 2.11 |
| $Li_2CO_3$ | 0.12 | 0.12 | 0.19 | 0.30 | 0.37 | 0.32 |
| $Li_2SO_4$ | 0.0 | 3.5 | 7.0 | 10.5 | 13.8 | 17.0 |
| Total Insolubles | 0.44 | 0.07 | 0.12 | 0.50 | 0.54 | 0.77 |
| Hydrogen Iodide Slip, percent wt. (basis butadiene yield) | 3.86 | 3.13 | 3.11 | 2.24 | 2.38 | 2.44 |

TABLE III

[Salt temperature: 1,045–1,070° F.]

| Run No. | 19 | 20 | 21 |
|---|---|---|---|
| LiOH, percent wt.: | | | |
| Initial | 3.0 | 3.1 | 4.9 |
| Final | 2.7 | 2.3 | 4.0 |
| NaI, percent wt.: | | | |
| Initial | 12.9 | 25.2 | 24.9 |
| Final | 18.3 | 31.3 | 33.9 |
| $Li_2SO_4$, percent wt.: | 9.5 | 9.2 | 9.2 |
| $I_2$ Pressure, p.s.i.a. | 8.8 | 9.2 | 8.6 |
| Time, hr | 18 | 18 | 64 |
| Corrosion Rate, mils/yr.:[1] | | | |
| Immersed | 240 | 32 | 15 |
| Vapor | 390 | 620 | |

[1] Corrosion rates based on weight loss of specimens.

In Runs 20 and 21, this synergistic effect is best illustrated. With the molten $LiI/LiOH/I_2$ system containing 9 percent by weight lithium sulfate and 25 percent by weight sodium iodide, the corrosion rate was found to be only 32 mils per year in a test run of 18 hours duration. Extension of the time of exposure to 64 hours gave a value of only 15 mils per year. With a molten $LiI/LiOH/I_2$ system containing about 14 percent by weight potassium iodide and 10 percent by weight lithium sulfate, a corrosion rate of only 31 mils per year was observed for an 18-hour exposure.

As noted earlier, the salts of the present invention possess the utility of reducing the amount of hydrogen iodide slip from the reactor, caused primarily by incomplete reaction of the hydrogen iodide with the metal oxide or hydroxide to form the metal iodide. Referring now to FIGS. II and III, it is seen that with increasing concentrations of sodium or potassium iodide in the melt, the hydrogen iodide slip from the reactor is reduced. In ad- Similar results for sodium and potassium iodide are noted in FIGURES II and III, showing a reduction in the hydrogen iodide slip in each case of up to 50 percent with 35 percent by weight KI or about 28 percent by weight NaI in the salt melt.

Tables V and VI show the effect of several $KI-Li_2SO_4$ and $NaI-Li_2SO_4$ combinations on reduction of hydrogen iodide slip in an iodative dehydrogenation reactor, illustrating that a synergistic effect is again exhibited when these salts are used in combination.

TABLE V

[Feed: n-Butane. Dehydrogenation zone temperature: 1,035° F.]

| Run No. | 28 | 29 | 30 | 31 | 32 |
|---|---|---|---|---|---|
| Average Salt Composition, percent wt.: | | | | | |
| LiI | 78.7 | 78.5 | 64.8 | 60.7 | 53.0 |
| NaI | 0.0 | 7.2 | 14.7 | 19.9 | 28.0 |
| LiOH | 2.11 | 1.95 | 1.87 | 1.70 | 1.76 |
| $Li_2CO_3$ | 0.34 | 0.31 | 0.25 | 0.27 | 0.30 |
| $Li_2SO_4$ | 17.0 | 16.5 | 16.4 | 15.8 | 15.6 |
| Hydrogen Iodide Slip, percent wt. (basis butadiene yield) | 2.44 | 2.12 | 1.70 | 1.44 | 1.19 |

TABLE VI

[Feed: n-Butane. Dehydrogenation zone temperature: 1,035° F.]

| Run No. | 33 | 34 | 35 | 36 | 37 | 38 | 39 |
|---|---|---|---|---|---|---|---|
| Average Salt Composition, percent wt.: | | | | | | | |
| LiI | 87.1 | 81.8 | 74.3 | 69.0 | 64.8 | 58.5 | 52.5 |
| KI | 0.0 | 6.1 | 12.3 | 17.6 | 23.2 | 28.7 | 34.2 |
| LiOH | 2.10 | 1.78 | 1.74 | 1.66 | 1.97 | 1.82 | 1.83 |
| $Li_2CO_3$ | 0.25 | 0.30 | 0.33 | 0.35 | 0.50 | 0.44 | 0.72 |
| $Li_2SO_4$ | 9.0 | 10.0 | 10.0 | 8.5 | 7.9 | 8.9 | 9.0 |
| Hydrogen Iodide Slip, percent wt. (basis butadiene yield) | 2.50 | 2.32 | 2.13 | 1.72 | 1.28 | 1.41 | 1.20 |

For any of the salts to be of practical use in an iodative dehydrogenation reactor, however, it is necessary that they cause no deleterious effects on the feed conversions and product selectivities. The data of Tables VII, VIII, and IX, which follow, indicate that, insofar as the hydrocarbon yields are concerned, there is no deleterious trend as the lithium iodide is diluted with lithium sulfate, sodium iodide, or potassium iodide up to almost 50 percent by weight. In fact, in each case, the butadiene/butene molar ratios increased.

TABLE VII

[Feed: n-Butane. Dehydrogenation zone temperature: 1,035° F.]

| Run No. | 40 | 41 | 42 | 43 | 44 | 45 |
|---|---|---|---|---|---|---|
| Average Salt Composition, percent wt.: | | | | | | |
| LiI | 97.2 | 94.2 | 90.0 | 85.0 | 81.7 | 78.7 |
| LiOH | 2.02 | 2.01 | 1.95 | 2.18 | 2.55 | 2.11 |
| $Li_2CO_3$ | 0.12 | 0.12 | 0.19 | 0.30 | 0.21 | 0.32 |
| $Li_2SO_4$ | 0.0 | 3.5 | 7.0 | 10.5 | 13.8 | 17.0 |
| Total Insolubles | 0.44 | 0.07 | 0.12 | 0.50 | 0.50 | 0.77 |
| Conversion, percent wt. carbon | 76.3 | 76.1 | 76.8 | 78.2 | 79.2 | 78.6 |
| Selectivity, percent wt. carbon: | | | | | | |
| $C_1$-$C_3$ | 12.6 | 10.9 | 11.0 | 10.2 | 9.48 | 11.4 |
| $CO_2$ | 1.95 | 2.09 | 2.01 | 1.61 | 1.66 | 1.64 |
| Butadiene | 62.6 | 65.6 | 65.4 | 66.8 | 66.2 | 65.2 |
| Butenes | 13.9 | 12.9 | 13.6 | 12.9 | 13.3 | 13.2 |
| iso-$C_4$ Saturated | 0.65 | 0.96 | 0.62 | 0.85 | 0.99 | 0.56 |
| Vinylacetylene | 1.03 | 1.12 | 1.13 | 1.19 | 1.29 | 1.18 |
| $C_5$ Unsaturates | 1.72 | 1.44 | 1.41 | 1.60 | 1.62 | 1.16 |
| Heavy Ends ($\geq C_6$) | 5.48 | 4.96 | 4.84 | 4.75 | 5.91 | 5.69 |
| Butadiene/Butene, mole/mole | 4.5 | 5.1 | 4.8 | 5.2 | 5.0 | 5.0 |

TABLE VIII

[Feed: n-Butane. Dehydrogenation zone temperature: 1,075–1,092° F.]

| Run No. | 46 | 47 | 48 | 49 |
|---|---|---|---|---|
| Salt Composition, percent wt.: | | | | |
| LiI | 94.6 | 79.2 | 69.0 | 59.0 |
| NaI | 1.30 | 17.3 | 26.0 | 35.4 |
| LiOH | 2.40 | 2.60 | 3.60 | 3.70 |
| $Li_2CO_3$ | 0.11 | 0.15 | 0.55 | 0.43 |
| $Li_5IO_6$ | <0.01 | <0.01 | <0.01 | <0.01 |
| Conversion, percent wt. | 85.5 | 85.0 | 83.0 | 85.5 |
| Selectivity, percent wt. carbon: | | | | |
| $C_1$-$C_3$ | 10.4 | 4.83 | 6.36 | 5.05 |
| $CO+CO_2$ | 1.53 | 1.78 | 1.74 | 1.15 |
| Butadiene | 73.6 | 82.5 | 81.5 | 81.1 |
| Butenes | 4.82 | 4.12 | 4.07 | 3.53 |
| iso-$C_4$ hydrocarbons | 0.20 | 0.41 | 0.34 | 0.33 |
| Vinylacetylene | 2.35 | 2.11 | 2.26 | 2.17 |
| $C_5$ Unsaturates | 0.67 | 0.66 | 0.70 | 0.74 |
| >$C_6$ hydrocarbons | 6.38 | 3.60 | 3.08 | 5.94 |
| Butadiene/Butene, mole/mole | 15.3 | 20.0 | 20.0 | 23.0 |

TABLE IX

[Feed: n-Butane. Dehydrogenation zone temperature: 1,000–1,050° F.]

| Run Nos. | 50–58 [1] | 59–75 [2] |
|---|---|---|
| Salt Composition, percent wt.: | | |
| LiI | 95.8 | 75.5 |
| LiOH | 3.0 | 2.8 |
| KI | 0.0 | 20.0 |
| $Li_2CO_3$ | 1.1 | 1.6 |
| Acid Insolubles | 0.16 | 0.09 |
| Conversion, percent wt. carbon | 63.6 | 63.5 |
| Selectivity, percent wt. carbon (basis feed): | | |
| $CO+CO_2$ | 2.0 | 3.1 |
| Cracked Products | 3.5 | 3.1 |
| Butadiene | 77.1 | 77.8 |
| Vinylacetylene | 1.6 | 1.7 |
| Styrene | 5.1 | 4.9 |
| Other Aromatics | 2.9 | 3.6 |
| Organic Iodides | 1.1 | 1.3 |
| $C_5$ Unsaturates | 1.6 | 1.4 |
| Heavy Ends | 5.1 | 3.2 |
| Butadiene/Butene, mole/mole | 5.5 | 6.3 |

[1] Figures expressed in this column are the averages of nine runs.
[2] Figures expressed in this column are the averages of seventeen runs.

We claim as our invention:

1. In a process for the dehydrogenation of a first hydrocarbon to a second hydrocarbon having a higher carbon-to-hydrogen ratio, wherein the first hydrocarbon is contacted in a reactor at a temperature in excess of 975° F. with iodine and a molten mass comprising a mixture of lithium iodide and lithium hydroxide, wherein the lithium iodide is the predominant component of said mixture, the improvement comprising providing in the molten mass at least 5 but less than 50 percent by weight molten lithium sulfate, potassium iodide or sodium iodide, or mixtures thereof.

2. A process in accordance with claim 1 wherein lithium sulfate comprises from 5 to 20 percent by weight of the molten mass.

3. A process in accordance with claim 1 wherein the potassium iodide comprises from 5 to 35 percent by weight of the molten mass.

4. A process in accordance with claim 1 wherein sodium iodide comprises from 5 to 35 percent by weight of the molten mass.

References Cited

UNITED STATES PATENTS 3,080,435   3/1963   Nager _____ 260—673.5
3,106,590   10/1963  Bittner _____ 260—680 X
3,168,584   2/1965   Nager _____ 260—680 X PAUL M. COUGHLAN, Jr., Primary Examiner.